United States Patent [19]
Hattori

[11] Patent Number: 6,158,890
[45] Date of Patent: *Dec. 12, 2000

[54] RETAINERLESS LINEAR MOTION BEARING

[76] Inventor: Kenichi Hattori, 3472, Hill St., Fairfax, Va. 22030

[*] Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 549 days.

[21] Appl. No.: 08/734,125

[22] Filed: Oct. 21, 1996

Related U.S. Application Data

[60] Continuation of application No. 08/467,433, Jun. 6, 1995, abandoned, which is a division of application No. 08/216,428, Mar. 23, 1994, abandoned.

[51] Int. Cl.[7] .................................................. F16C 29/06
[52] U.S. Cl. ............................................. 384/45; 384/624
[58] Field of Search ............................... 384/448, 45, 43, 384/44; 464/168, 624

[56] References Cited

U.S. PATENT DOCUMENTS

| | | |
|---|---|---|
| 4,253,709 | 3/1981 | Teramachi . |
| 4,427,240 | 1/1984 | Teramachi . |
| 4,616,886 | 10/1986 | Teramachi . |
| 4,674,893 | 6/1987 | Teramachi . |
| 4,793,720 | 12/1988 | Merker, Jr. . |
| 4,844,624 | 7/1989 | Teramachi . |
| 4,902,143 | 2/1990 | Morita . |
| 4,934,834 | 6/1990 | Morita . |
| 4,974,971 | 12/1990 | Tanaka . |
| 4,976,551 | 12/1990 | Scharting et al. . |
| 5,082,374 | 1/1992 | Narumiya . |
| 5,123,754 | 6/1992 | Tanaka . |
| 5,265,963 | 11/1993 | Kawaguchi . |
| 5,275,492 | 1/1994 | Shirai . |
| 5,308,170 | 5/1994 | Yamaguchi et al. . |
| 5,358,338 | 10/1994 | Komiya . |
| 5,360,271 | 11/1994 | Agari . |
| 5,362,156 | 11/1994 | Hara . |
| 5,375,931 | 12/1994 | Teramachi . |

FOREIGN PATENT DOCUMENTS

| | | |
|---|---|---|
| 0 435 858 A1 | 7/1991 | European Pat. Off. . |
| 3-153915 | 1/1991 | Japan . |

*Primary Examiner*—Lenard A. Footland
*Attorney, Agent, or Firm*—Armstrong, Westerman, Hattori, McLeland & Naughton

[57] ABSTRACT

A ball holder for a retainerless saddle having an elongated shaft and a plurality of contact surfaces therearound to hold steel balls in cooperation with a bearing body only when the saddle is withdrawn from a rail. The shaft can be made of a hollow tube or a pair of cantilever projections so that the size of its cross-sectional area can be adjusted. Due to this adjustability the size of the raceways can also be adjusted to enable to reassemble the steel balls into the saddle at a working site.

4 Claims, 13 Drawing Sheets

STEP 1  ATTACH END CAP 5 AT THE BOTTOM OF THE BEARING BODY 4.

STEP 2  INSERT RACEWAY SPACER A INTO THE CAVITY OF THE BEARING BODY 4.

STEP 3  FEED STEEL BALLS 7 ... INTO RACEWAY 9...,
ESCAPE-BALL THROUGH HOLES 10...,

STEP 4  COVER THE OPEN END SURFACE OF THE BEARING BODY 4 TO FORM SADDLE 6.

STEP 5  MOVE SADDLE 6 ONTO BALL HOLDER 1.

RETAINERLESS LINEAR MOTION BEARING

This application is a continuation of application Ser. No. 08/467,433, filed Jun. 6, 1995, now abandoned, which is a divisional of application Ser. No. 08/216,428, filed Mar. 23, 1994, abandoned.

BACKGROUND OF THE INVENTION

A conventional linear motion bearing shown in U.S. Pat. No. 4,253,709 has a large rigidity and can sustain a heavy load at a high speed with a high accuracy. Due to those excellent properties, it has been widely used especially in a field of machine tools.

One of the main features of the linear motion bearing is that it can provide a preload in the steel balls since the diameter of the steel ball is slightly larger than that of the raceway formed between the complementary grooves of the bearing body and the rail. Due to the preload, the assembled rigidity of the structure becomes larger which, in turn, enables to attain high accuracy.

On the other hand, one of the shortcomings of the linear motion bearing is in the usage of a retainer which holds or maintains the steel balls from falling off from the bearing body when it is withdrawn out of the rail.

The shape of the retainer can be either a plate structure as shown in FIG. 8 in U.S. Pat. No. 4,253,709 or a piano wire-like structure extending along the grooves as shown in U.S. Pat. No. 4,929,095.

These retainers are attached either to the bearing body or to the end caps. Because of this, the structure of the linear motion bearing becomes more complicated and more difficult to assemble a saddle from bearing body with steel balls by an automatic process.

Further, if the retainer dislocates its position, it may contact the steel balls and increases the friction. The retainer will be damaged or destroyed eventually. It also increases the cost of the linear motion bearing.

Another problem of the retainer lies in that the size of the radius of the curvature of the groove is inevitably limited due to existence of the retainer in the narrow raceway and so is the load rating.

It is well known that the retainer loses its function and becomes useless once the saddle is fit onto the rail since the steel balls are held solely by the complementary grooves.

Nevertheless, there must be a retainer since if the retainer is eliminated from the linear motion bearing, there is no way to maintain the steel balls within the bearing body of the saddle when it is withdrawn from the rail.

Yet another problem is how to fit the saddle onto the rail while maintaining the loose steel balls.

SUMMARY OF THE INVENTION

This invention is directed to a retainer-less linear motion bearing in which a retainer is completely eliminated from a bearing body. Instead, a ball holder independent of the bearing body, or a saddle, is used only when the saddle is withdrawn from the rail to retain the steel balls within the bearing body so as to prevent them from falling off when it is withdrawn from the rail.

This invention is also directed to a method for automatically assembling a complete saddle from a bearing body, end caps, steel balls and a ball holder.

Another object of the invention is to provide an adjustable ball holder which enables to reassemble the saddle at a working site without using any special devices.

DESCRIPTION OF THE PREFERRED EMBODIMENTS

The first embodiment is directed to a ball holder 1 in which the raceway space formed by bearing body 4 and ball holder 1 is not adjustable.

Figure 1:
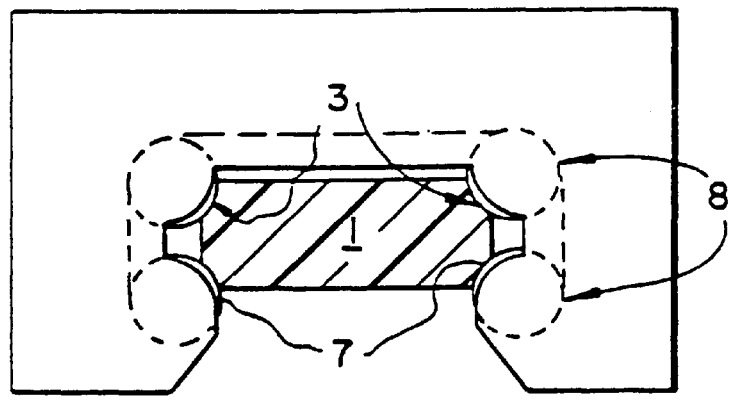
FIG. 1 illustrates a cross-sectional view of a saddle 6 with a ball holder 1 of the present invention.
Figure 2:
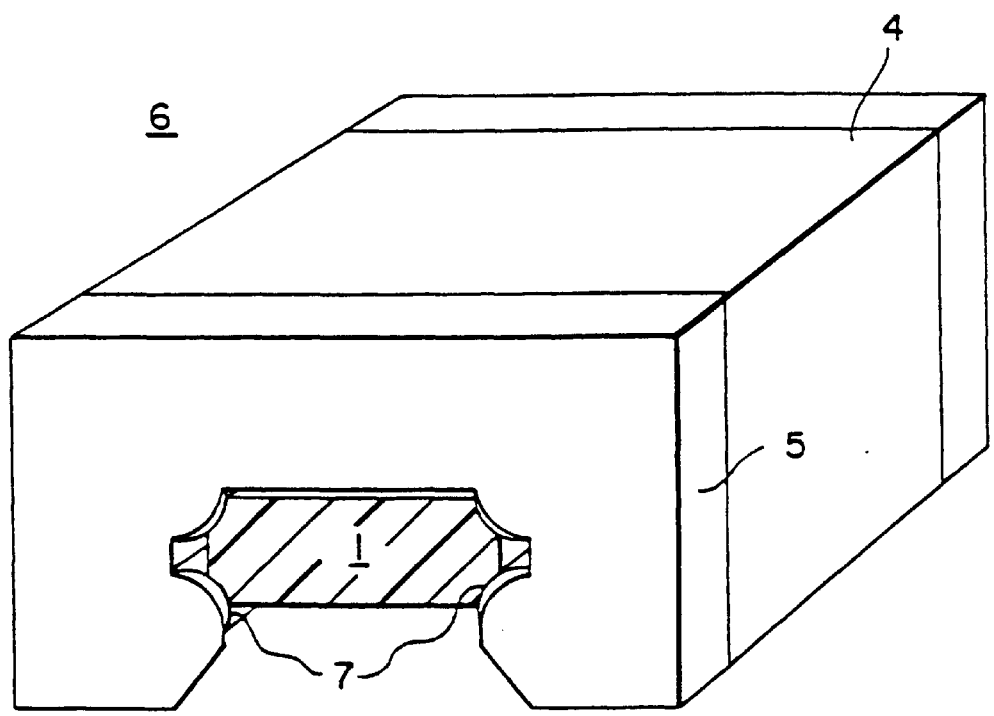
FIG. 2 illustrates a perspective view of saddle 6.
Figure 3:
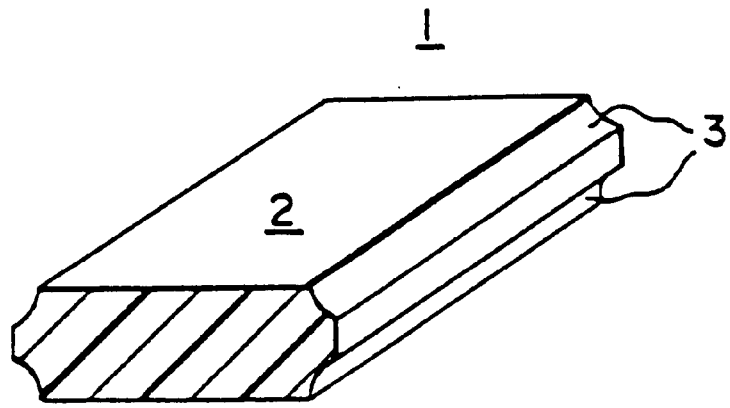
FIG. 3 illustrates a perspective view of ball holder 1.
Figure 4:
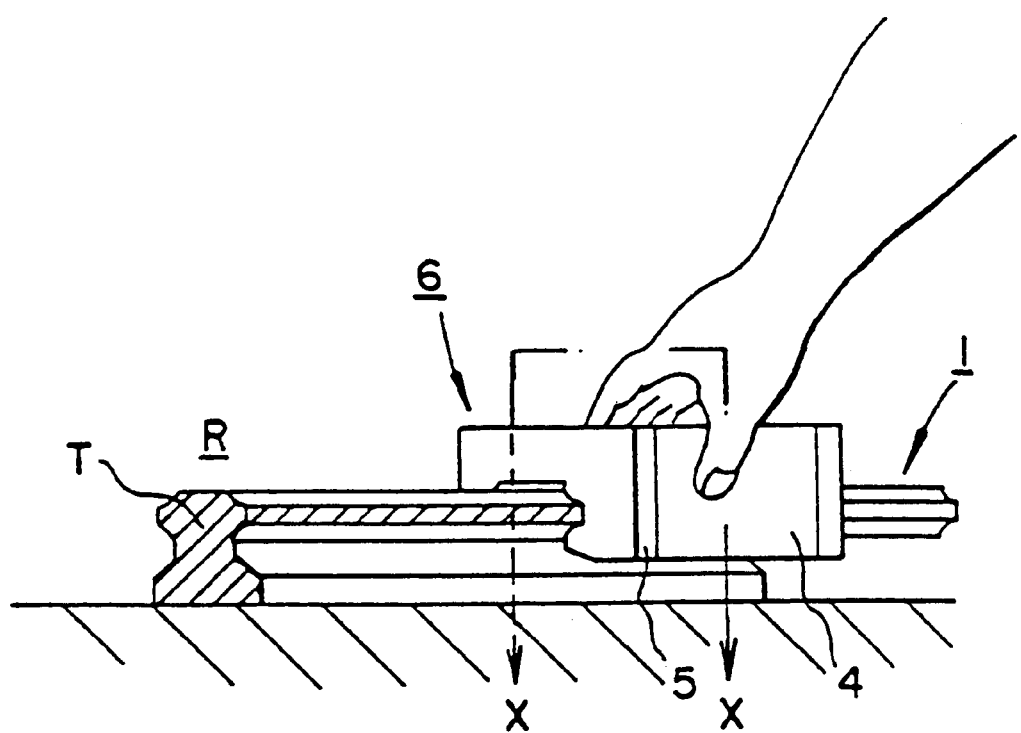
FIG. 4 illustrates a method to assemble saddle 6 onto rail R.
Figure 5:
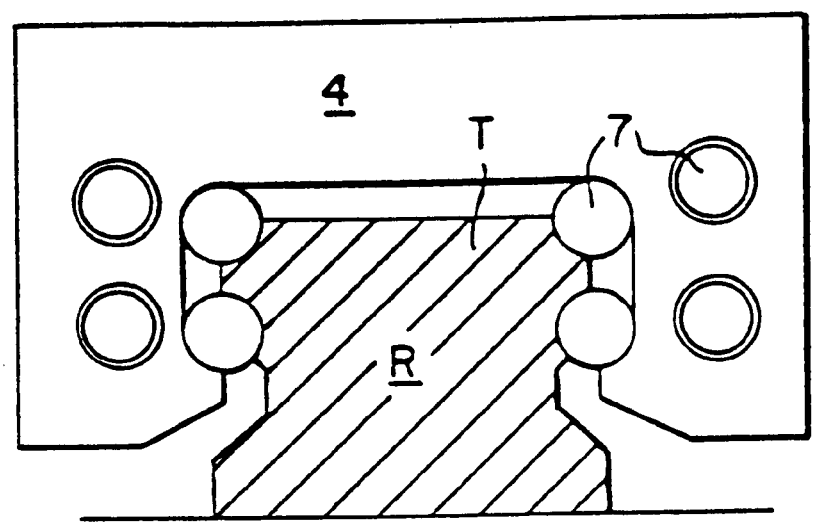
FIG. 5 illustrates a cross-sectional view of retainer-less linear bearing along X—X in FIG. 4.

FIG. 1 illustrates a cross-sectional view of a retainerless saddle 6 with a ball holder 1 according to this invention. FIG. 2 shows a perspective view of saddle 6. FIG. 3 shows a perspective view of ball holder 1. The cross-section of ball holder 1 is almost identical to that of track shaft part T, which is a top part of the rail R as shown in FIGS. 4 and 5. Ball holder 1 is formed by elongated shaft 2 and a plurality of grooves 3 . . . at about four corners of elongated shaft 2. The number of the grooves 3 . . . can be two or more depending upon that of track shaft part T or that of saddle 6.

The material of shaft 2 is preferably an elastic one such as soft plastic as shown in FIG. 3.

When saddle 6 is withdrawn from rail R, steel balls 7 are maintained by ball holder 1. The diameter of the raceway formed by a complementary groove 8 of bearing body 4 and a complementary grooves 3 of ball holder 1 is slightly smaller than that of a steel ball 7. Therefore, the grooves 3 . . . of ball holder 1 are slightly compressed by steel balls 7 . . . such that ball holder 1 is press fitted within saddle 6.

Also, since ball holder 1 is smaller than the cavity within bearing body 4 of saddle 6, in storing a plurality of saddles 6 . . . each having ball holder 1 therein, they can be placed one upon another. Thus, the storage to a plurality of saddles 6 . . . is very convenient and occupies less space according to this invention.

As shown in FIG. 4, in order to assemble saddle 6 onto rail R, saddle 6 is held by one hand of an operator while fitting the inner opening of end cap 5 onto track shaft part T of rail R and is moved toward rail R. As saddle 6 moves leftward in FIG. 4, steel balls 7 . . . are successively held within the raceways between the complementary grooves 8 . . . of saddle 6 and those of rail R, thus are preloaded since the diameter of each raceway is smaller than that of steel ball 7. Eventually ball holder 1 is completely removed from saddle 6 since it is stopped by the end surface of track shaft part T.

Thus, steel balls 7 . . . are maintained between rail R and bearing body 4 without a retainer as shown in FIG. 5.

In order to remove saddle 6 from rail R, ball holder 1 is first positioned at the end surface of track shaft part T. Then saddle 6 is moved rightward in FIG. 4 from rail R over ball holder 1 such that steel balls 7 . . . are successively held between the complementary grooves of saddle 6 and ball holder 1.

Figure 6:
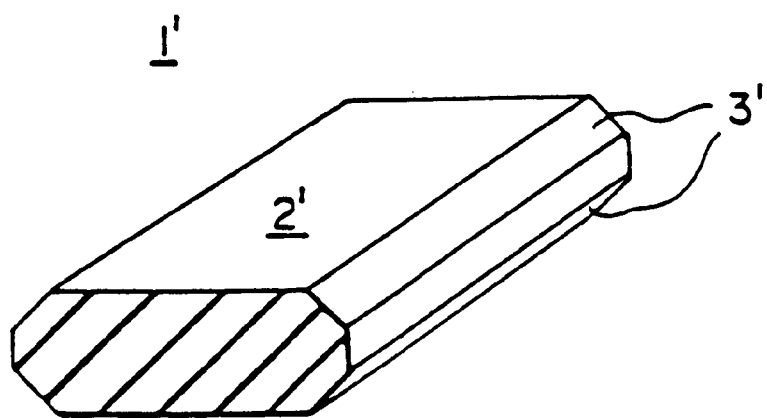
FIG. 6 illustrates a perspective view of ball holder 1' made of rubber.

If shaft 2 is made of a material with a plenty of elasticity such as rubber, grooves 3 may be eliminated and instead they can be flat surfaces 3' as shown in FIG. 6.

Also shaft 2 can be made of a transparent material such that the steel balls 7 can be observed through the transparent body of shaft 2.

The length of ball holder 1 is at least the same to that of bearing body 4 or longer.

Figure 7:
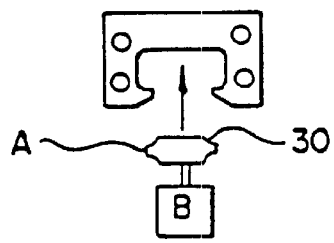
FIG. 7 illustrates a process to automatically assemble a saddle 6 from bearing body 4, end caps 5, 5, steel balls 7 . . . , and ball holder 1.
Figure 7:
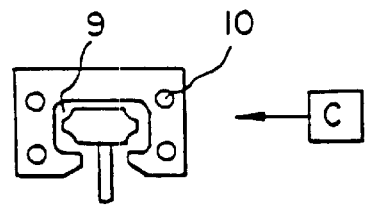
Figure 7:
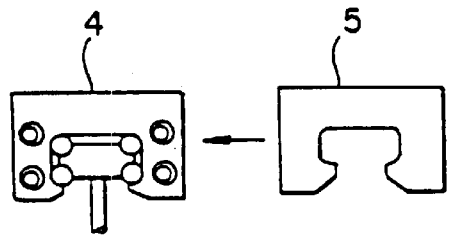
Figure 7:
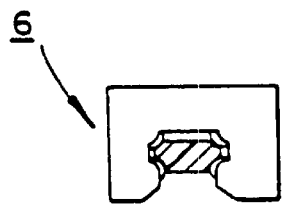

FIG. 7 illustrates the process for assembling saddle 6 from bearing body 4, end caps 5, steel balls 7 . . . and ball holder 1.

The process proceeds as follows:

Step 1. End cap 5 is attached at one end, preferably at a bottom end, of bearing body 4. Then it is fed, with, preferably, the attached end cap facing downward and an open end of bearing body 4 facing upward.

Step 2. Raceway Spacer A is inserted into the open cavity within bearing body 4 by Raceway Spacer Moving Device B. Raceway Spacer A is provided with a plurality of grooves 30 . . . each corresponding to each of grooves 8 . . . of bearing body 4. The diameter of each raceway space 9 formed by complementary grooves 30 and 8 is same or slightly larger than that of steel ball 7.

Step 3. Steel balls 7 are fed into raceway spaces 9 . . . and escape-ball through holes 10 . . . Due to end cap 5 attached at the bottom of bearing body 4, steel balls 7 . . . are easily fed by Ball Feed Device C into raceway spaces 9 . . . , escape-ball through holes 10 . . . and ball-recirculating grooves in end cap 5.

Step 4. Close top open end surface of bearing body 4 by a second end cap 5. It is preferable that ball-recirculating grooves in second end cap 5 are previously filled with steel balls 7. . . At this stage saddle 6 is formed by bearing body 4 and a pair of end caps 5, 5, Raceway Spacer A, and a plurality of steel balls 7 . . . , however, there is no preload provided in any of steel balls 7 . . . yet.

Step 5. Ball holder 1 is positioned at beneath of bottom end cap 5 and then saddle 6 is slid down onto ball holder 1. Since the material of ball holder 1 is much softer than that of steel balls 7 and of bearing body 4, ball holder 1 is slightly compressed without imparting much preload in steel balls 7 . . . so that it is firmly maintained within saddle 6 by friction.

Figure 8:
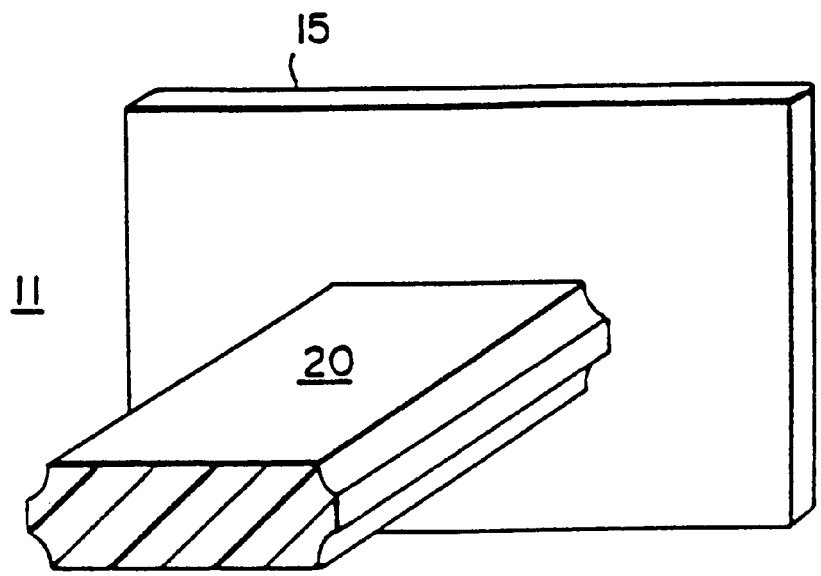
FIG. 8 illustrates a ball holder 11 provided with end plate 15.

It is preferable that ball holder 11 is further provided with end plate 15 at its one end as shown in FIG. 8. End plate 15 has a peripheral configuration substantially identical to the overall configuration of end cap 5.

Figure 9:
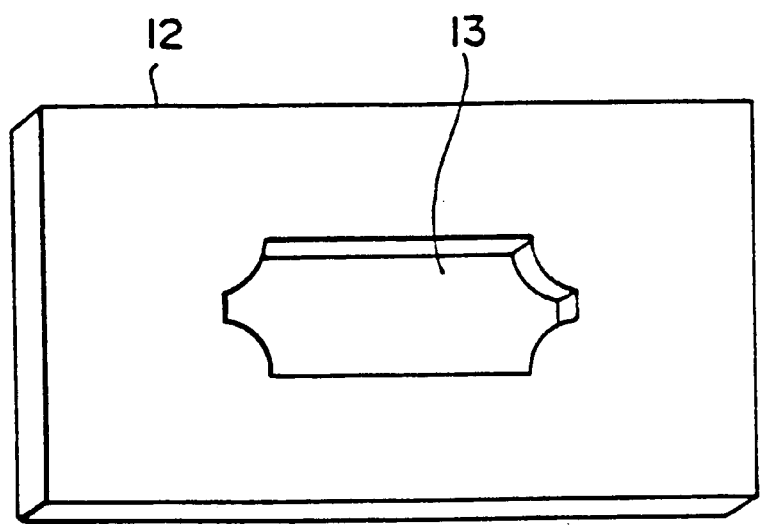
FIG. 9 illustrates a detachable end plate 12.

Shaft 2 of the ball holder 2 can be made longer than that of saddle 6 and be provided at both distal ends with detachable end plates 12, 12 as shown in FIG. 9. Each of end plates 12, 12 has a shape substantially identical to the size of overall configuration of end cap 5 and is provided with a window 13 through which the distal end of shaft 2 fits with friction. Then the ball holder 1 can be maintained within saddle 6 with certainty since end plates 12, 12 holds saddle 6 therebetween.

One of end plate s 12, 12 can bs permanently fixed at a distal end of shaft 2.

Figure 10:
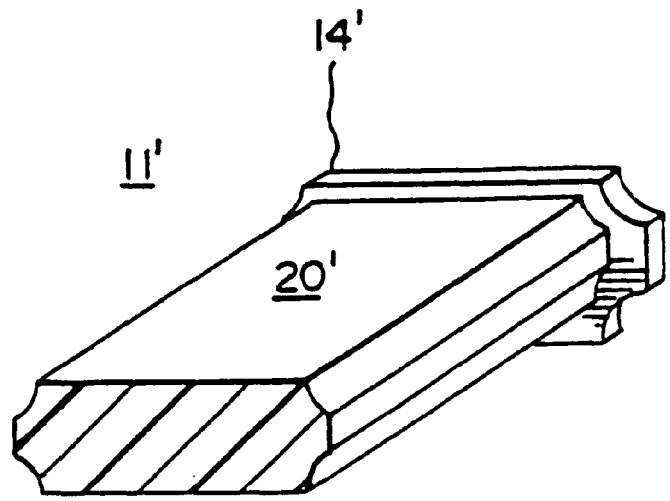
FIG. 10 illustrates a ball holder 11' with a friction plate 14'.
Figure 11:
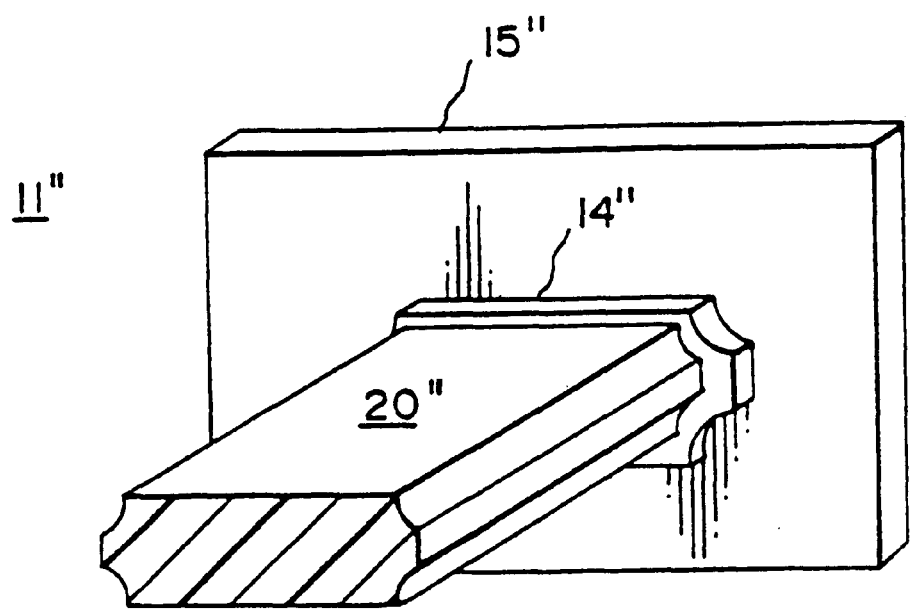
FIG. 11 illustrates a ball holder 11" with an end plate 15" and a step portion 14".

Further, as shown in FIG. 10, a fit plate 14' can be provided at one end of shaft 2. Or step portion 14" can be provided between end plate 15" and shaft 20" as shown in FIG. 11. Fit plate 14' or step portion 14" abuts within the inner opening of end cap 5 in order to reinforce the frictional gripping. One advantage of the embodiments shown in FIGS. 10 and 11 is that it is easy to align the shaft with accuracy within the bearing body due to friction plate 14' or step portion 14" such that it makes it easier to reassemble saddle 6, the steel balls 7 . . . and ball holder 11' after saddle 6 was accidentally removed from the rail R without using ball holder 11' and steel balls 7 . . . fell off to the ground.

Next embodiments shown in FIGS. 12 through 20 are directed to the ball holder capable to provide adjustable raceway spaces.

Figure 12:
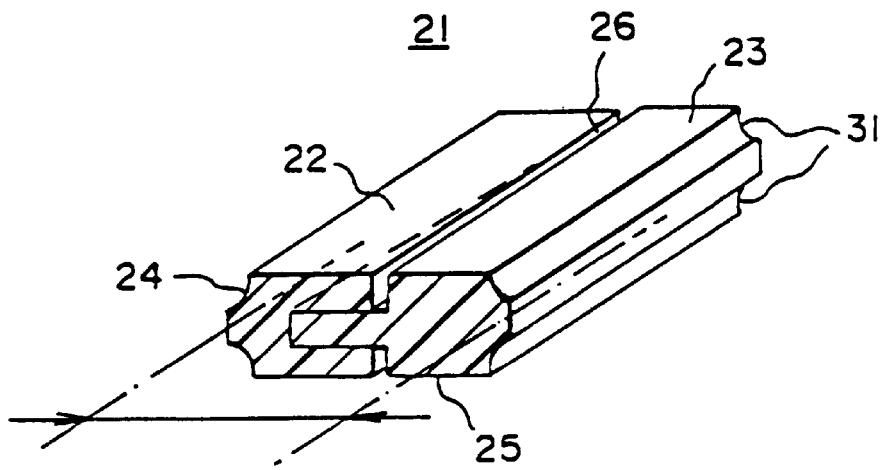
FIG. 12 illustrates an adjustable ball holder 21.
Figure 13:
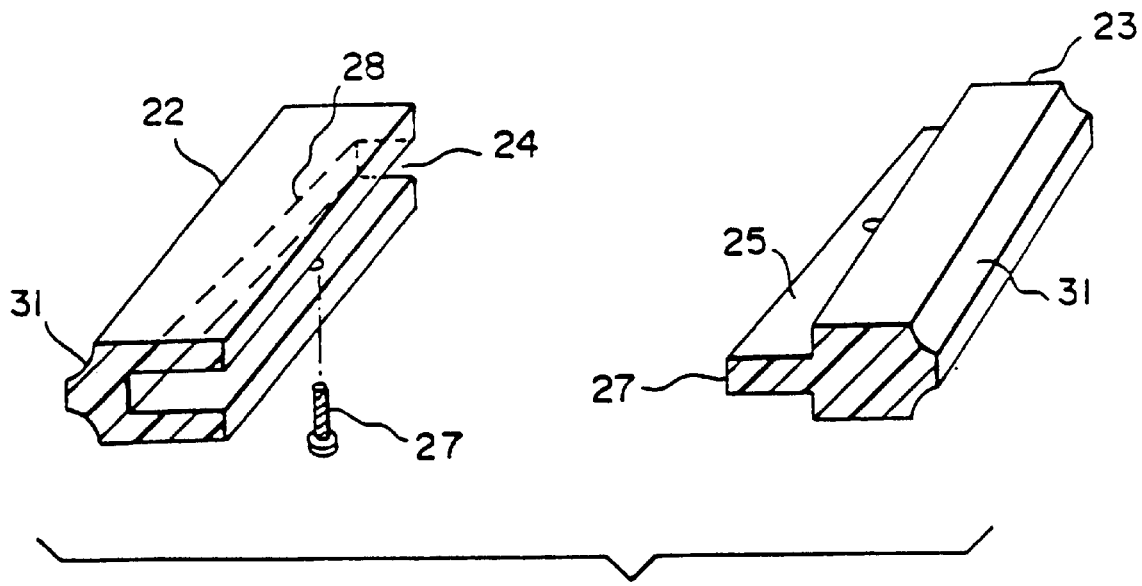
FIG. 13 illustrates the deassembled state of adjustable ball holder 21.
Figure 14:
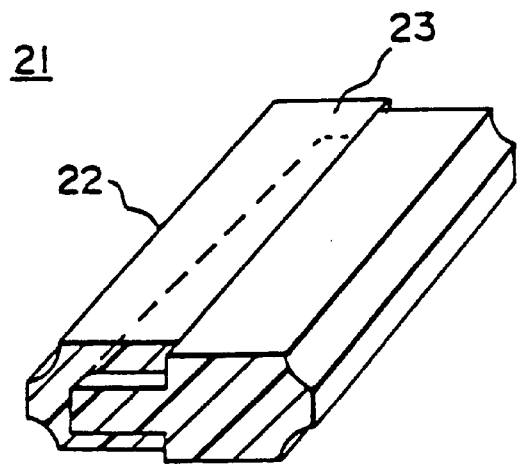
FIG. 14 illustrates a contracted state of adjustable ball holder 21.

FIG. 12 illustrates adjustable ball holder 21 composed of a pair of independent first and second shaft parts 22 and 23. First shaft part 22 is provided with a concave 24. Concave 24 is provided with a inclined bottom surface 28. On the other hand, second shaft 23 has inclined projection 25 which fits into concave 24. When first and second shaft 22 and 23 are assembled with both end surfaces flushing each other, they rest with a small clearance 26 therebetween and their combined end surfaces form a configuration substantially identical to that of track shaft part T of rail R.

As first and second shaft parts 22 and 23 are slightly dislocated from each other along their axial direction, clearance 26 is eliminated. Adjustable ball holder 21 of this contracted state is first inserted into the cavity of bearing body 4 and steel balls 7 . . . are fed into enlarged raceway spaces 9 . . . . Each of raceway spaces 9 . . . formed by grooves 31 . . . of adjustable ball holder 21 and grooves 8 . . . of bearing body 4 is slightly larger than steel balls 7 . . . so that filling of steel balls 7 . . . is easily accomplished.

Figure 15:
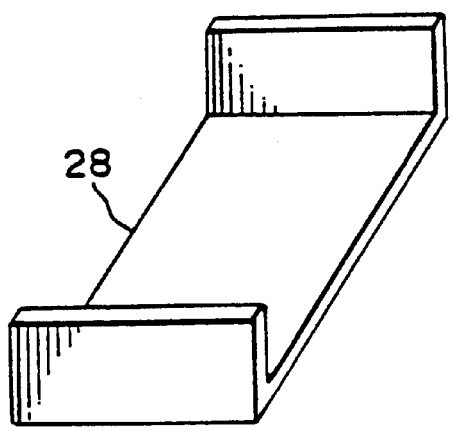
FIG. 15 illustrates a stop cover 28 for adjustable ball holder 21.

After all raceway spaces 9 . . . and escape-ball through holes 10 . . . and ball-recirculating grooves in end cap 5 are filled with steel balls 7 . . . , another end cap 5 is fixed to cover the opening end of bearing body 4. Then first and second shaft parts 22 and 23 are axially slid until both end surfaces flush each other. The relative position of first and second shaft parts 22 and 23 is maintained by friction, or preferably by detachable screw 27. Alternatively, stop cover 28 as shown in FIG. 15 can be used instead of screw 27.

Figure 16:
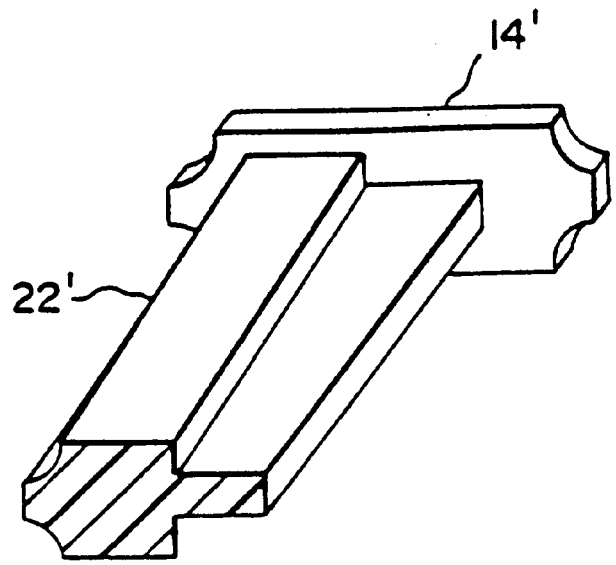
FIG. 16 illustrates second shaft 22' having fit plate 14'.

FIG. 16 shows another embodiment of second shaft 22' provided with fit plate 14' which fits into the inner opening of end cap 5.

Figure 17:
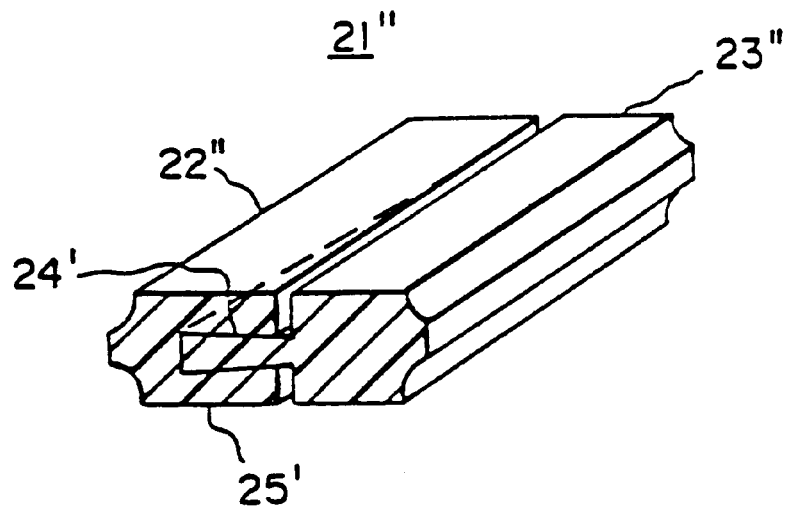
FIG. 17 illustrates adjustable ball holder 21" having tapered recess 24" and tapered projection 25".

FIG. 17 shows still another embodiment of first and second shaft 22" and 23" in which concave 24' and projection 25' are both tapered in their cross-sections.

Figure 18:
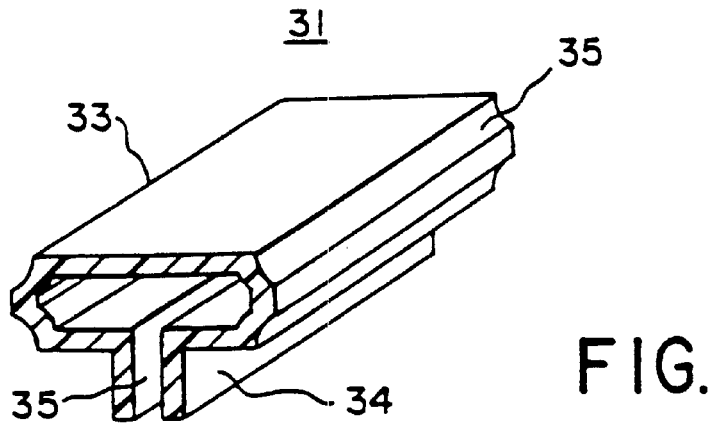
FIG. 18 illustrates adjustable tubular ball holder 33 having a slit 35.

FIG. 18 illustrates still further embodiment in which shaft 33 is somewhat tubular and has a cross-sectional configuration almost identical to that of track shaft part T of rail R except it has a cut opening 35 at its bottom formed by a pair of lips 34, 34. Provided at the four corners of ball holder 33 are grooves 35 . . . substantially identical to those of track shaft part T of rail R.

Figure 19:
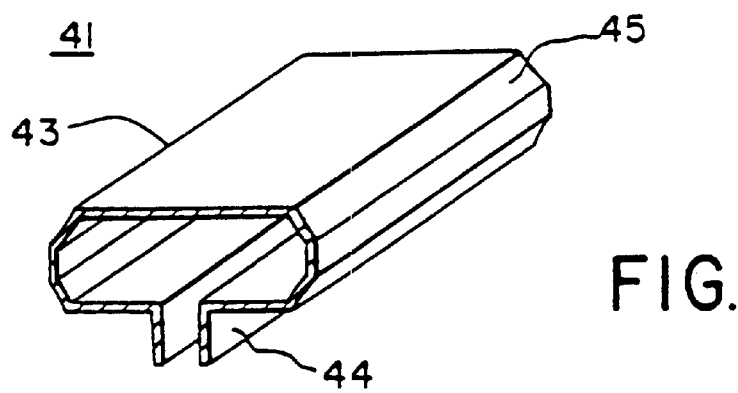
FIG. 19 illustrates adjustable tubular ball holder 43 made of a metal.
Figure 20:
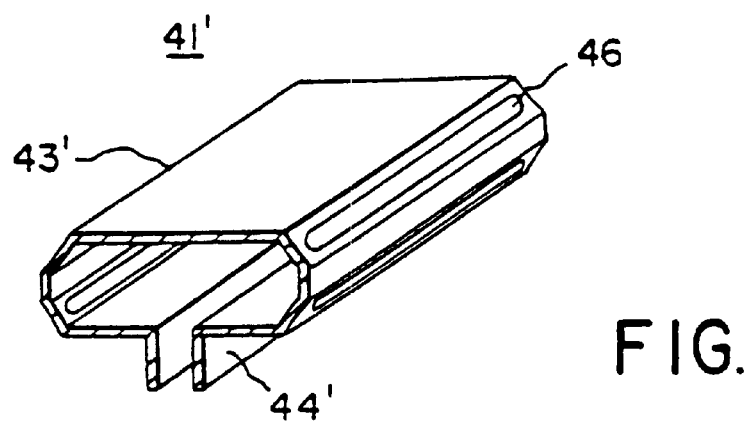
FIG. 20 illustrates adjustable tubular ball holder 43' having slits 46.

FIGS. 19 and 20 show different embodiments of such ball holder which are here made of metal. In FIG. 20, ball holder 43' is provided with windows 46 which enable easy holding of the steel balls 7 . . . .

Figure 21:
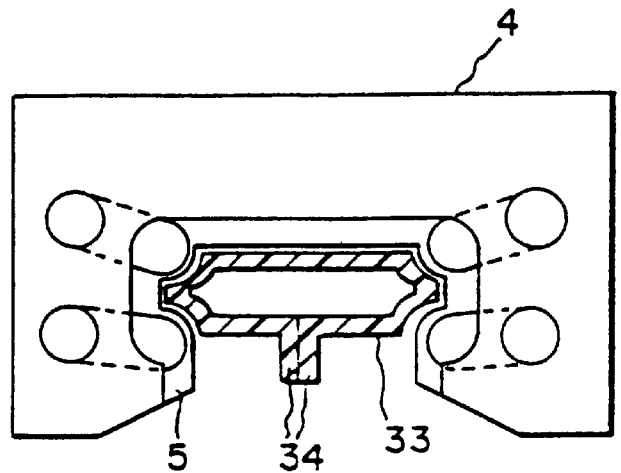
FIG. 21 illustrates a state when adjustable tubular ball holder 33 is placed within bearing body 4.

In each of those embodiments, the outer configuration of ball holder 33 . . . is substantially identical to that of track shaft part T, however, becomes smaller when lips 34 and 34 are held to contact each other as shown in FIG. 21 such that the diameter of each raceway space 9 formed therein becomes slightly larger than that of steel ball 7. After steel balls 7 . . . are filled in the raceway spaces, lips 34 and 34 are released so that ball holder 33 springs back to its original shape and steel balls 7 . . . are held between bearing body 4 and ball holder 33.

Figure 22:
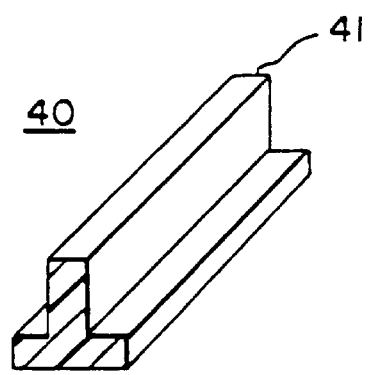
FIG. 22 illustrates insertion member 40 for adjustable tubular ball holder 33.

FIG. 22 illustrates insertion member 40 to be inserted into clearance 35 between lips 34 and 34. Since the width of projection 41 of stop member 40 is slightly larger than clearance 35 between lips 34 and 34 after the steel balls 7 . . . are filled, ball holder 33 is even more firmly held in saddle 6 when stop insertion 40 is inserted.

Further, insertion member 40 prevents ball holder 33 from being deformed due to the resistance from preloaded steel balls 7 . . . when saddle 6 slides onto rail R and thus also prevents steel balls 7 . . . from falling off due to the possible deformation.

Figure 23:
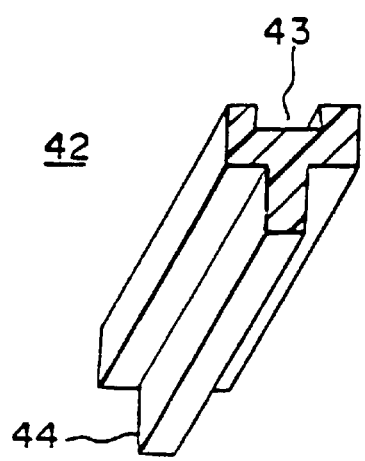
FIG. 23 illustrates insertion member 42 having recess 43 for adjustable ball holder 33 or 53 or 65.

FIG. 23 illustrates another insertion member 42 having recess 43 and projection 44. Recess 43 works to hold lips 34 and 34 to contact each other.

Figure 24:
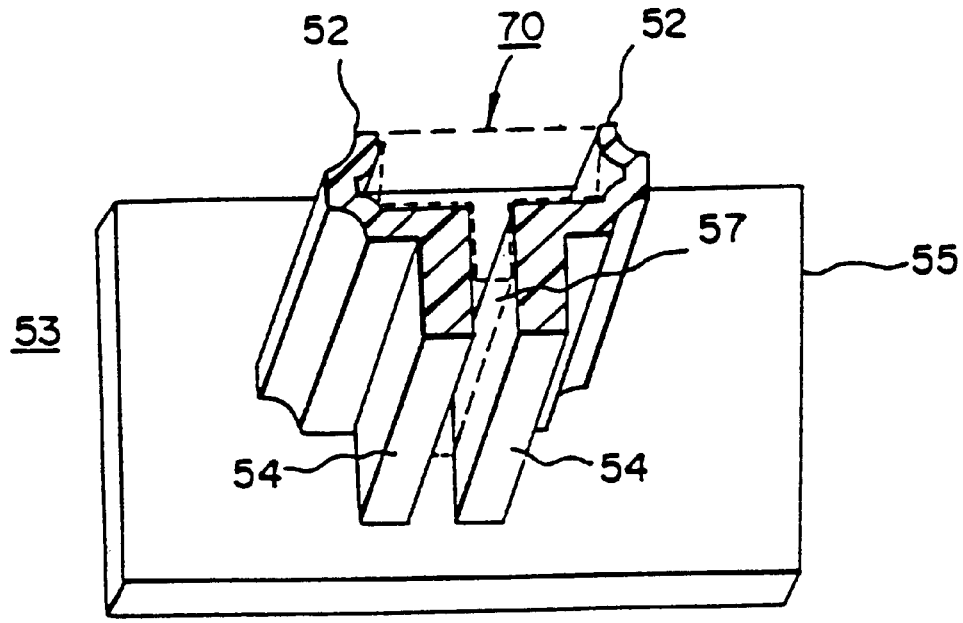
FIG. 24 illustrates adjustable ball holder 53 having end plate 55.

FIG. 24 illustrates another embodiment of adjustable ball holder 53 having end plate 55 and a pair of separated cantilever projections 52, 52 projecting therefrom.

The outer configuration of end plate 55 is substantially identical to that of end cap 5 or of bearing body 4. Therefore, when ball holder 53 is inserted into saddle 6, with the position of side plate 55 exactly coincides with end cap 5, the positions of separated cantilever projections 52 and 52 are also determined in the exact locations to provide the raceways 9 . . . each slightly smaller than the diameter of steel balls 7 . . . .

Then the central clearance 57 between separated cantilever projections 52 and 52 is narrowed by holding lips 54 and 54 to contact each other in order to fill the steel balls 7 . . . into the slightly widened raceways 9 . . . . After completion of filling steel balls 7 . . . , lips 54 and 54 are released so that separated cantilever projections 52 and 52 hold steel balls 7 . . . against the grooves 8 . . . of bearing body 4.

Figure 25:
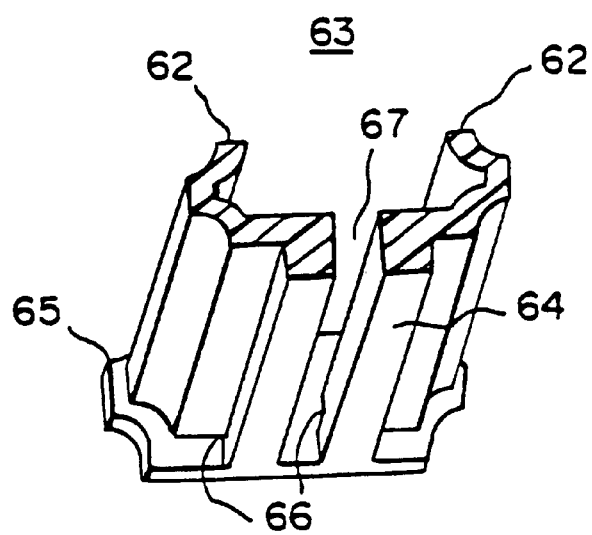
FIG. 25 illustrates adjustable ball holder 53 having fit plate 65.

FIG. 25 illustrates another embodiment of ball holder 63 provided with fit plate 65 which abuts with the inner opening of end cap 5 with friction. Also, cantilever projections 62, 62 are separated from fit plate 65 with clearance 66 such that cantilever projections 62 and 62 can be easily inclined.

Figure 26:
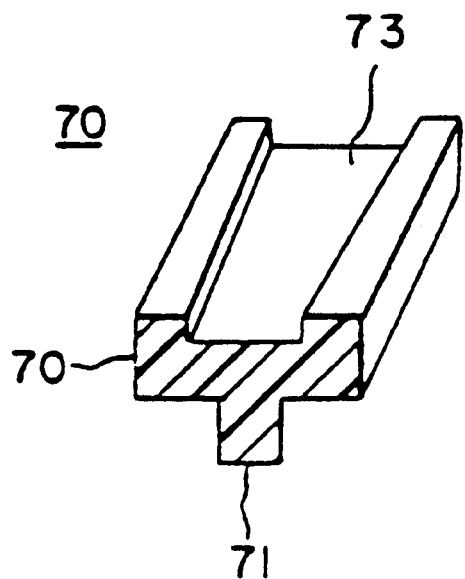
FIG. 26 illustrates another insertion member 70 with tapered recess 73.

FIG. 26 illustrates insertion member 70 having a projection 71 and tapered recess 73. The outer cross-section of insertion member 70 is identical to the inner cross-section of the inner cavity between cantilever projections 52 and 52 or 62 and 62.

First, clearance 57 or 67 is narrowed by moving tapered recess 73 onto lips 54 and 54 or 64 and 64. After steel balls 7 . . . are supplied, insertion member 70 is withdrawn from the lips. Then whole insertion member 70 is inserted into the inner cavity of cantilever projections 52 and 52 or 62 and 62 such that ball holder 53 or 63 hold steel balls 7 . . . more firmly.

Figure 27:
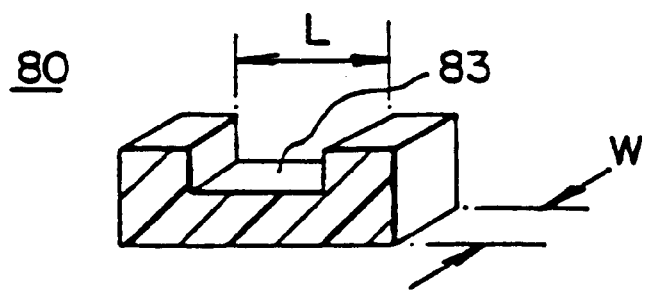
FIG. 27 illustrates short insertion member 80 with recess 83.

FIG. 27 illustrates short insertion member 80 with recess 83. The length L of recess 83 is much shorter than the distance between the outer edges of the lips 54 and 54 or 64 and 64 in order to close clearance 57 or 67.

The width W of short insertion member 80 is slightly substantially identical to clearance 57 or 67. Thus when saddle 6 is assembled, short insertion member 80 is inserted into narrowed clearance 57 or 67 by steel balls 7 . . . so as to push the cantilever projections outwardly.

What is claimed is:

1. A ball holder for a retainerless saddle having a bearing body and a pair of end caps attached thereto, said ball holder to be used when the retainerless saddle is taken out of a rail, the retainerless saddle having a recess, the retainerless saddle to be assembled with the rail with a plurality of preloaded steel balls therebetween when said retainerless saddle is slid onto said rail to form a preloaded retainerless linear motion bearing assembly, said ball holder comprising:

an elongated shaft portion independent of the retainerless saddle and to be positioned within the recess of the retainerless saddle only when the retainerless saddle is taken out of the rail, the elongated shaft portion also being independent from the rail, wherein said elongated shaft portion includes a plurality of ball holding means for directly holding the steel balls and for preventing said steel balls from falling off when the retainerless saddle is taken out of said rail, wherein the plurality of ball holding means comprises a circumferential surface of the elongated shaft portion along the axis thereof and are separate from the retainerless saddle, each of said ball holding means being positioned adjacent to each of grooves provided within the bearing body, such that each of said ball holding means and each of said grooves of the bearing body form an independent raceway, wherein the positions of the ball holding means of said ball holder is substantially identical to that of the positions of grooves of a track shaft part of the rail the ball holder is used only when the retainerless saddle is taken out of the rail to maintain the balls between the ball holder and the retainerless saddle and is moved out of the retainerless saddle when said saddle is inserted onto the rail to form a preloaded linear bearing assembly, wherein the elongated shaft is elastic.

2. A ball holder for a retainerless saddle having a bearing body and a pair of end caps attached thereto,said ball holder to be used when the retainerless saddle is taken out of a rail, the retainerless saddle having a recess, the retainerless saddle to be assembled with the rail with a plurality of preloaded steel balls therebetween when said retainerless saddle is slid onto said rail to form a preloaded retainerless linear motion bearing assembly, said ball holder comprising:

an elongated shaft portion independent of the retainerless saddle and to be positioned within the recess of the retainerless saddle only when the retainerless saddle is taken out of the rail, the elongated shaft portion also being independent from the rail, wherein said elongated shaft portion includes a plurality of ball holding means for directly holding the steel balls and for preventing said steel balls from falling off when the retainerless saddle is taken out of said rail, wherein the plurality of ball holding means comprises a circumferential surface of the elongated shaft portion along the axis thereof and are separate from the retainerless saddle, each of said ball holding means being positioned adjacent to each of grooves provided within the bearing body, such that each of said ball holding means and each of said grooves of the bearing body form an independent raceway, wherein the positions of the ball holding means of said ball holder is substantially identical to that of the positions of grooves of a track shaft part of the rail, the ball holder is used only when the retainerless saddle is taken out of the rail to maintain the balls between the ball holder and the retainerless saddle and is moved out of the retainerless saddle when said saddle is inserted onto the rail to form a preloaded linear bearing assembly, wherein the material of the elongated shaft is made of soft plastic.

3. A ball holder for a retainerless saddle having a bearing body and a pair of end caps attached thereto, said ball holder to be used when the retainerless saddle is taken out of a rail, the retainerless saddle having a recess, the retainerless saddle to be assembled with the rail with a plurality of preloaded steel balls therebetween when said retainerless saddle is slid onto said rail to form a preloaded retainerless linear motion bearing assembly, said ball holder comprising:

an elongated shaft portion independent of the retainerless saddle and to be positioned within the recess of the retainerless saddle only when the retainerless saddle is taken out of the rail, the elongated shaft portion also being independent from the rail, wherein said elongated shaft portion includes a plurality of ball holding means for directly holding the steel balls and for preventing said steel balls from falling off when the retainerless saddle is taken out of said rail, wherein the plurality of ball holding means comprises a circumferential surface of the elongated shaft portion along the axis thereof and are separate from the retainerless saddle, each of said ball holding means being positioned adjacent to each of grooves provided within the bearing body, such that each of said ball holding means and each of said grooves of the bearing body form an independent raceway, wherein the positions of the ball holding means of said ball holder is substantially identical to that of the positions of grooves of a track shaft part of the rail, the ball holder is used only when the retainerless saddle is taken out of the rail to maintain the balls between the ball holder and the retainerless saddle and is moved out of the retainerless saddle when said saddle is inserted onto the rail to form a preloaded linear bearing assembly, wherein the elongated shaft is comprised of first and second shaft parts adjoining each other.

4. The ball holder of claim 3. wherein the first part is provided with a concave portion having an inclined bottom surface, while the second part is provided with an inclined projection which fits into the concave portion of the first part.

* * * * *